United States Patent
Choi

(10) Patent No.: US 9,241,182 B2
(45) Date of Patent: Jan. 19, 2016

(54) METHOD FOR SETTING TIME OF DISPLAY APPARATUS, METHOD FOR SETTING TIME OF DISPLAY APPARATUS BY REMOTE CONTROLLER, DISPLAY APPARATUS AND REMOTE CONTROLLER

(71) Applicant: SAMSUNG ELECTRONICS CO., LTD., Suwon-si (KR)

(72) Inventor: Young-hun Choi, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/271,917

(22) Filed: May 7, 2014

(65) Prior Publication Data

US 2014/0333842 A1 Nov. 13, 2014

(30) Foreign Application Priority Data

May 7, 2013 (KR) .................. 10-2013-0051558

(51) Int. Cl.
*H04N 21/422* (2011.01)

(52) U.S. Cl.
CPC .................. *H04N 21/42207* (2013.01)

(58) Field of Classification Search
USPC ........................................ 348/734
See application file for complete search history.

(56) References Cited

U.S. PATENT DOCUMENTS

| | | | | |
|---|---|---|---|---|
| 5,677,895 A | * | 10/1997 | Mankovitz | 368/10 |
| 5,867,224 A | * | 2/1999 | Suh | 348/553 |
| 2002/0184626 A1 | * | 12/2002 | Darbee et al. | 725/39 |
| 2003/0066080 A1 | * | 4/2003 | Kamieniecki | 725/80 |
| 2006/0072603 A1 | | 4/2006 | Kamise | |
| 2006/0107295 A1 | * | 5/2006 | Margis et al. | 725/81 |

FOREIGN PATENT DOCUMENTS

| | | | |
|---|---|---|---|
| JP | 2005101950 | * | 4/2004 |
| JP | 2006-094357 A | | 4/2006 |
| KR | 1019980007604 A | | 3/1998 |
| KR | 10-2004-0090519 A | | 10/2004 |
| KR | 1020100131873 A | | 12/2010 |
| KR | 10-1059165 B1 | | 8/2011 |

OTHER PUBLICATIONS

Communication dated Mar. 27, 2014, issued by the Korean Intellectual Property Office in counterpart Korean Application No. 10-2013-0051558.

Communication dated Aug. 20, 2014, issued by the International Searching Authority in counterpart International Application No. PCT/KR2014/003994.

Communication (Written Opinion) dated Aug. 20, 2014, issued by the International Searching Authority in counterpart International Application No. PCT/KR2014/003994.

* cited by examiner

*Primary Examiner* — Michael Teitelbaum

(74) *Attorney, Agent, or Firm* — Sughrue Mion, PLLC

(57) ABSTRACT

A method of setting time information of a display apparatus is provided. The method includes: receiving a Turn-on signal from a remote controller; receiving time information from the remote controller in response to a determination that resetting the time information is necessary; and setting time information of the display apparatus based on the received time information.

17 Claims, 9 Drawing Sheets

200

METHOD FOR SETTING TIME OF DISPLAY APPARATUS, METHOD FOR SETTING TIME OF DISPLAY APPARATUS BY REMOTE CONTROLLER, DISPLAY APPARATUS AND REMOTE CONTROLLER

CROSS-REFERENCE TO RELATED APPLICATION

This application claims priority from Korean Patent Application No. 10-2013-0051558, filed on May 7, 2013 in the Korean Intellectual Property Office, the disclosure of which is incorporated herein by reference, in its entirety.

BACKGROUND

1. Field

The exemplary embodiments relate to a method for setting time of a display apparatus. More particularly, the exemplary embodiments relate to a method for setting time of a display apparatus for controlling an RTC of a display apparatus, a method for setting time of a display apparatus by a remote controller, a display apparatus and a remote controller.

2. Description of the Related Art

Generally, an On TV service provides a service that recommends programs to users by analyzing a user's viewing habits, matters of interest, trends, etc. Smart TVs request a server to search for a program based on the data relating to a user, and display information on the program provided by the server. In response to the Smart TV being powered on by a user with a remote controller, etc., the Smart TV displays information, etc., relating to recommended programs. The program information provided by the Smart TV not only includes information related to Internet-based programs, but also programs with real-time broadcast information. The Smart TV generally maintains current time information including a Real Time Clock (RTC) module, since it is required to contain information on the current time in order to provide broadcast information in real-time.

A TV is consistently supplied with a standby power while being connected to an external power source; for example, an alternating current (AC) power source. Even when the TV is powered off by shutting off the main power, the RTC module can maintain the current time information by a supply of standby power, as long as the TV is connected to the AC power source.

However, when the TV is shut off from even the external power supply by a user, the standby power supply is also cut off, and standby power is no longer supplied to the RTC module. As a result, the RTC module loses the current time information.

When power is again supplied to the smart TV, that is, when the smart TV is powered on, the smart TV performs the operation of the RTC module. The RTC module, which does not have the current time information, performs time synchronization in order to set the time. Time synchronization is an operation to synchronize time with the time provided by a broadcasting station or the time provided from the server. Even when the smart TV is powered on, delays occur when providing an On TV Service which is time-dependent, or performing other operations, since the smart TV is required to receive time information either by being connected to the server or from a broadcasting station, so as to set the RTC module Therefore, there is a need to solve the problem of delays which occur during services such as rapidly providing programs for users, when the smart TV loses time information due to being shut off from an external power source.

SUMMARY

An object of the exemplary embodiments is to provide a method for setting time of a display apparatus; a method for setting time of a display apparatus by a remote controller; a display apparatus and a remote controller, which enables users to be rapidly provided with services based on time information, even when the smart TV loses time information due to a shut off from an external power source.

One or more exemplary embodiments provide a method for setting the time of a display apparatus, which may include: receiving a Turn-On signal from a remote controller; receiving time information from the remote controller in response to a determination that resetting the time information is necessary; and setting time information of the display apparatus based on the time information received from the remote controller.

One or more exemplary embodiments also provide a method for setting time of a display apparatus, in which the receiving time information may include: requesting time information from the remote controller when the Turn-On signal is received, subsequent to an external power source of the display apparatus being shut off and reconnected; and receiving time information from the remote controller in response to the request. However, in the case of receiving the Turn-on signal from the remote controller when the external power source is connected to the display apparatus, or when charge power remains in the display apparatus, the time information is not received from the remote controller.

One or more exemplary embodiments also provide a method for setting the time of a display apparatus, which may further include transmitting the predetermined time information to the remote controller when the external power source is connected to the display apparatus and shuts off therefrom.

One or more exemplary embodiments also provide a method for setting time of a display apparatus, which may further include: receiving a Turn-off signal from the remote controller; and transmitting the predetermined time information to the remote controller.

According to an aspect of an exemplary embodiment, there is provided a method for setting time of a display apparatus by a remote controller, including: transmitting a Turn-on signal to the display apparatus, which is generated according to a user command; and transmitting time information of the remote controller to the display apparatus when there is a request from the display apparatus.

The transmitting time information may further include: receiving a request of time information from the display apparatus; and transmitting time information of the remote controller to the display apparatus in response to the request of time information.

The method for setting time may further include receiving from the display apparatus time information of the display apparatus, when the display apparatus is off; and resetting time information of the remote controller based on the received time information.

The method for setting time may include: requesting the display apparatus for time information upon receiving a user command to turn off the display apparatus; receiving the time information from the display apparatus in response to the request; resetting time information of the remote controller based on the received time information; and transmitting to the display apparatus a signal to turn off the display apparatus.

According to an aspect of an exemplary embodiment, there is provided a display apparatus, which includes: a communicator configured to receive a Turn-on signal from a remote controller; and a controller configured to control the communicator to receive time information from the remote controller in response to a determination that resetting the time information is necessary, and to set time information of the display apparatus based on the received time information.

The controller of the display apparatus may be configured to control to request the remote controller for time information upon receiving a Turn-on signal after the external power of the display apparatus is shut off and reconnected, and to receive time information from the remote controller in response to the request.

The controller of the display apparatus may be further configured to control not to receive the time information from the remote controller in the case of receiving a Turn-on signal from the remote controller when the external power source is connected to the display apparatus or when charge power remains in the display apparatus.

The controller may be configured to control the predetermined time information to be transmitted to the remote controller, when the external power source is connected to the display apparatus and shut off therefrom.

The controller may be further configured to control the predetermined time information to be transmitted to the remote controller when the communicator receives a Turn-off signal from the remote controller.

According to an aspect of an exemplary embodiment, there is provided a remote controller, which includes: a communicator configured to transmit to the display apparatus a Turn-on signal, which is generated according to an input user command; and a controller configured to control time information of the remote controller to be transmitted to the display apparatus when there is a request from the display apparatus.

Further, in response to the communicator receiving a request of time information from the display apparatus, the controller may be configured to control time information of the remote controller to be transmitted to the display apparatus in response to the request for time information.

Further, in response to the display apparatus being off, the communicator may be configured to receive from the display apparatus time information of the display apparatus, and the controller may be configured to reset time information of the remote controller based on the received time information.

Further, upon receiving a user command to turn off the display apparatus, the communicator may request time information from the display apparatus, and receive the time information from the display apparatus in response to the request, and the controller may be configured to reset time information of the remote controller based on the received time information and control a signal to turn off the display apparatus to be transmitted to the display apparatus.

An aspect of an exemplary embodiment may provide a display apparatus including: a controller configured to control a communicator to receive time information from a remote controller in response to a determination that resetting the time information is necessary, and to set the time information based on the received time information.

The display apparatus may include a remote controller configured to send time information to the controller. In addition, the display apparatus may further include a communicator configured to receive a Turn-on signal from the remote controller.

The controller may be configured to control to request time information from the remote controller in the case of receiving a Turn-on signal after the external power of the display apparatus is shut off and reconnected, and to receive time information from the remote controller in response to the request.

The controller may further control not to receive the time information from the remote controller in the case of receiving a Turn-on signal from the remote controller when the external power source is connected to the display apparatus or when charge power remains in the display apparatus.

The controller may be configured to control the predetermined time information to be transmitted to the remote controller when the external power source is connected to the display apparatus and then shut off therefrom.

In addition, the controller may be configured to control the predetermined time information to be transmitted to the remote controller when the communicator receives a Turn-off signal from the remote controller.

The remote controller may include: a communicator configured to transmit to the display apparatus a Turn-on signal which is generated according to a input user command; and a controller configured to control time information of the remote controller to be transmitted to the display apparatus when there is a request from the display apparatus. According to various exemplary embodiments, the present invention enables rapidly providing users with services based on time information, even in the case of losing time information due to a shut off of a display apparatus from an external power source.

DETAILED DESCRIPTION OF THE EXEMPLARY EMBODIMENTS

Hereinafter, exemplary embodiments will be described in greater detail with reference to the accompanying drawings.

Figure 1:
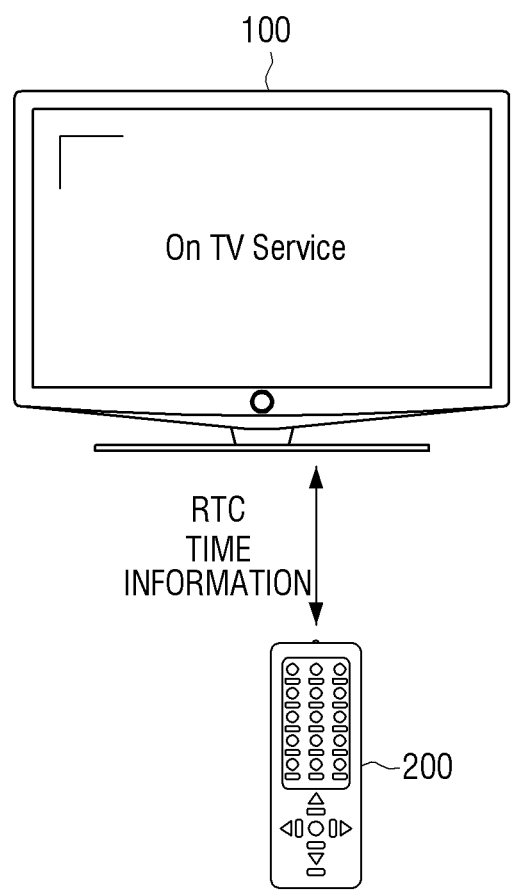
FIG. 1 is a schematic view which illustrates an operation of a display system according to an exemplary embodiment.

FIG. 1 is a schematic view which illustrates an operation of a display system according to an exemplary embodiment. The display apparatus 100 of FIG. 1 may be embodied by digital smart TVs which generally provide program information using time information. However, the display apparatus is not limited thereto, and may be embodied by various types of display apparatuses such as a 3D TV, a monitor, a mobile phone, a tablet PC, an electronic picture frame, or a kiosk. Referring to FIG. 1, the display system of the exemplary embodiments includes a display apparatus 100 and a remote controller 200 to control the display apparatus. According to an exemplary embodiment of FIG. 1, the display apparatus provides an On-TV Service that provides users with desired programs based on time information. FIG. 1 illustrates that the display apparatus 100 is powered on by being again connected to the external power source, after the external power source is completely shut off and the supply of standby power is also cut off. Accordingly, in this case, the display apparatus 100 does not have current time information. At this point, when the display apparatus 100 is once again powered on, a display apparatus 100 of the related art operates to receive time information via connection to a server, or receives time information from a broadcast station. As a result, when the display apparatus is powered on, a delay occurs in the case of providing an On-TV Service that is time-dependent, or performing other functions.

However, when powered on as described above, the display apparatus 100 of the exemplary embodiments receives the current time information from the remote controller 200. Time may be set instantly for the display apparatus 100 by receiving the current time information when the display apparatus is powered on, which enables rapidly providing information related to recommended programs.

In the specification, Power-Off and Turn-Off are distinguished. In other words, Power-Off refers to a case of shutting off the entire supply of power to the display apparatus, including standby power, while Turn-Off refers to a case of supplying only the standby power to the display apparatus 100. In the latter case, an image is not displayed, although an external power source is connected.

Hereinafter, a detailed configuration and operation of the display apparatus 100 and the remote controller 200 will be described in detail.

Figure 2:
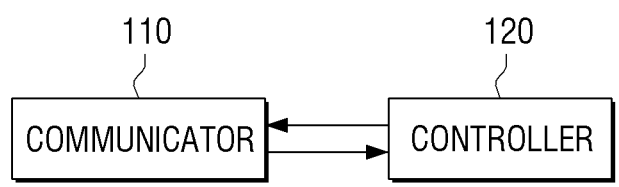
FIG. 2 is a block diagram which illustrates an example of a display apparatus.

FIG. 2 is a block diagram which illustrates an example of a display apparatus 100 according to an exemplary embodiment. Although not illustrated in FIG. 2, the display apparatus 100 may include a display apparatus from the related arts.

Referring to FIG. 2, the display apparatus 100 includes a communicator 110 and a controller 120.

The communicator 110 is configured to perform communication with the remote controller 200, 200-1. Specifically, the communicator 110 receives a Turn-ON signal or a Turn-Off signal from the remote controller 200, 200-1. The communicator 110 transmits the received signal to the controller 120, and the controller 120 generates a control command corresponding to the received signal in order to operate the display apparatus 100.

The received signal may be embodied in the form of a Radio Frequency (RF) signal or an Infra Red (IR) signal. To this end, the communicator 110 may include a short-distance communication module, such as a Bluetooth® module, an Infrared Data Association (IrDA) module, a Near Field Communication (NFC) module, or a Zigbee® module.

The controller 120 controls the overall operation of the display apparatus 100. The controller 120 includes hardware such as CPU and a cache memory, an operating system, and application software for a specific purpose. Control command for each element for the operation of the display apparatus 100 according to a system clock is read in a memory, and according to the read control command, an electric signal is generated to operate each element of hardware.

In particular, in response to a determination that resetting time information of the display apparatus 100 is necessary, the controller 120 controls the communicator 110 to receive time information from the remote controller 200, 200-1, and based on the received time information, sets time information of the display apparatus 100.

Resetting time information of the display apparatus 100 is necessary when the maintained time information is lost due to the power-off of the display apparatus 100, and then the display apparatus 100 is powered on or turned on again. At this point, the communicator 110 receives time information from the remote controller 200.

Specifically, upon receiving the Turn-On signal after the external power source of the display apparatus 100 is shut off and connected again, the communicator 110 requests that the remote controller 200, 200-1 provide time information. Further, the communicator 110 receives time information from the remote controller 200, 200-1 in response to the request. The controller 120 resets time information of the display apparatus 100 using the received time information.

According to another exemplary embodiment of the present invention, even when receiving the Turn-On signal from the remote controller 200, 200-1, the controller 120 controls not to receive the time information from the remote controller 200200-1, in the case where the external power source is connected to the display apparatus 100, or charge power remains in the display apparatus 100. In the former case, time information of the display apparatus 100 is maintained through the supply of standby power, since the external power is supplied to the display apparatus 100 when turned off, and thus, it is not necessary for the display apparatus to receive time information again.

In the latter case, the display apparatus 100 further includes a charger (not shown) to charge power when standby power or external power is supplied. In this case, the charger uses power supplied from the standby power or external power to perform charging, and when the display apparatus 100 is powered off, the charged power may be used to maintain time information. In response to the charged power not being completely consumed during the time when the display apparatus 100 is powered off and powered on again, there is no concern about losing time information, and thus, the controller 120 may control not to receive the time information from the remote controller 200, 200-1.

According to another exemplary embodiment of the display apparatus 100, the controller 120 controls the predetermined time information to be transmitted to the remote controller 200, 200-1, when the external power source is connected to the display apparatus 100 and shut off therefrom. In the exemplary embodiment, the remote controller 200, 200-1 may include a circuit that has its own power to maintain time information. in response to the display apparatus 100 being powered off due to the shut off from the external power source, time information of the display apparatus 100 is transmitted to the remote controller 200, 200-1. Then, when powered on later, the display apparatus 100 requests that the remote controller 200, 200-1 provide time information which is managed thereby.

Similarly, the controller 120 controls the display apparatus 100 to transmit the predetermined time information to the remote controller 200, 200-1, even in the case where the communicator 110 receives the Turn-Off signal from the remote controller 200, 200-1.

Hereinafter, various exemplary embodiments will be described in detail.

Figure 3:
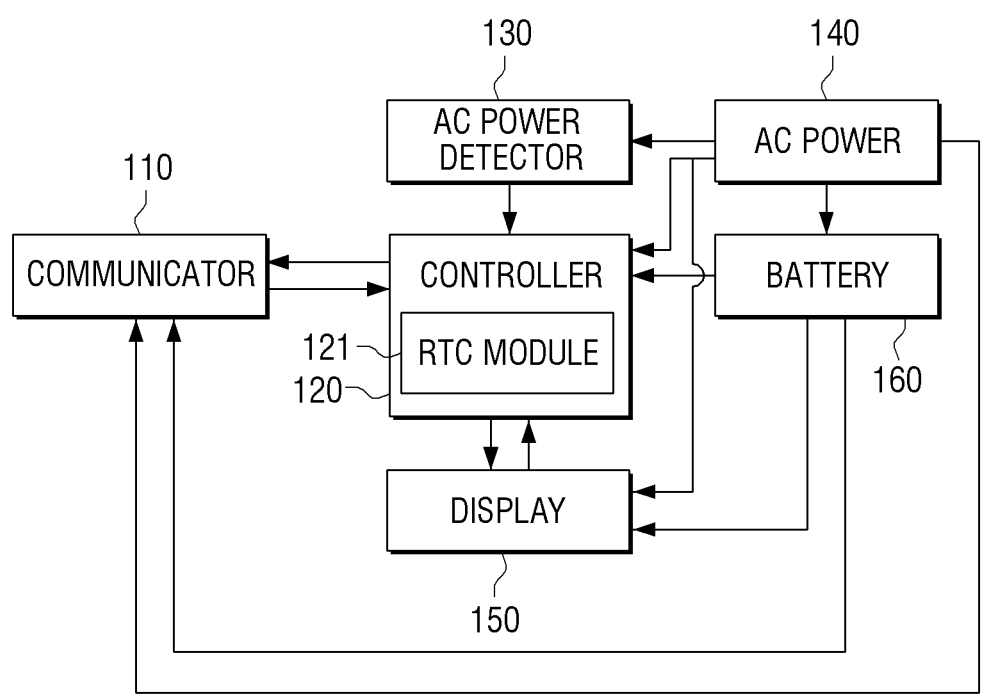
FIG. 3 is a block diagram which illustrates another example of a display apparatus.

FIG. 3 is a block diagram illustrating another example of a display apparatus 100-1 of the of the exemplary embodiments.

Referring to FIG. 3, the display apparatus 100-1 according to another exemplary embodiment includes a communicator 100, a controller 120, AC power detector 130, a display, AC power and a battery. The display apparatus 100-1 is supplied with AC power 140, which is then supplied to each element thereof. The AC power detector 130 detects whether AC power is supplied to or shut off from the display apparatus 100-1. The AC power detector 130 transmits the detected results related to the supply of power to the controller 120.

The battery 160 is configured to charge the AC power. The battery 160 charges power when the AC power source is connected, and supplies power to the controller 120 when the display apparatus 100-1 is powered off. When the display apparatus 100-1 is powered on, the controller 120 is supplied with power from the AC power source 140 in order to maintain time information by controlling the RTC module 121, and when the display apparatus 100-1 is powered off, power is supplied from the battery 160 to operate the RTC module 121.

The display 150 is configured to display an image. The display 150 displays an image when the display apparatus 100-1 is turned on, and does not display an image when the display apparatus 100-1 is turned off. The display 150 may be embodied with any one of a Liquid Crystal Display Panel, a Plasma Display Panel, an Organic Light Emitting Diodes, a Vacuum Fluorescent Display, a Field Emission Display and an Electro Luminescence Display.

The controller 120 as described above includes an RTC module that manages time information of the display apparatus 100-1. The RTC module maintains the current time information, and has a default value when losing time information due to shut-off of the power supply. When time information is lost due to power-off of the display apparatus 100-1, and then the display apparatus 100-1 is powered on or turned on again, the controller 120 makes a determination to reset the time information, as the RTC module has a default value.

As the communicator 110 receives time information from the remote controller 200, the RTC module sets the current time information according to the received time information. At this point, time information of the display apparatus 100-1 is set considering delays in the communication process.

Hereinafter, structure and operation of the remote controller 200, 200-1 according to an exemplary embodiment will be described in detail.

Figure 4:
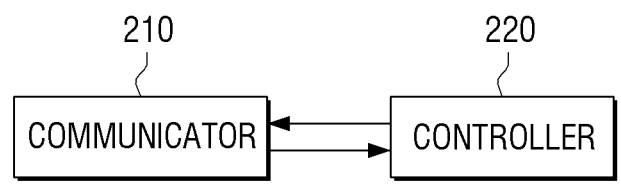
FIG. 4 is a block diagram which illustrates an example of a remote controller according to an exemplary embodiment.

FIG. 4 is a block diagram which illustrates an example of a remote controller 200 according to an exemplary embodiment.

Referring to FIG. 4, the remote controller 200 includes a communicator 210 and a controller 220.

The communicator 210 is configured to transmit to the display device 100, 100-1 a Turn-On signal generated according to an input user command. As in the case of the aforementioned display apparatus 100, 100-1, the communicator 210 transmits a signal in the form of a Radio Frequency (RF) or an Infra Red (IR). To this end, the communicator 110 may include at least one short-distance (local) communication module, selected from among a Bluetooth® module, an Infrared Data Association (IrDA) module, a Near Field Communication (NFC) module, or a Zigbee® module.

The controller 220 controls time information of the remote controller 200 to be transmitted to the display apparatus 100, 100-1, at the request of the display apparatus 100, 100-1. Specifically, when a user operates an operating button of the remote controller 200, the controller 220 generates a control signal which corresponds to the operation of the operating button, and controls the communicator 210 to transmit the generated control signal to the display apparatus 100.

In particular, when the communicator 210 receives a request of time information from the display apparatus 100, 100-1, the controller 220 controls time information of the remote controller 200 to be transmitted to the display apparatus 100, 100-1, in response to the request for time information. As described above, the display apparatus 100, 100-1, which does not have time information when turned on, requests that the remote controller 200 provide the time information.

Further, when the display apparatus 100, 100-1 is powered off, the communicator 210 receives from the display apparatus 100 time information related to the display apparatus, and the controller 220 resets time information of the remote controller 200 based on the received time information.

In addition, when a user command to turn off the display apparatus 100, 100-1 is received, the communicator 210 requests that the display apparatus 100, 100-1 provide the time information, and may receive the time information from the display apparatus 100, 100-1 in response to the request. At this point, the controller 220 resets time information of the remote controller 200 based on the received time information, and controls the signal to turn off the display apparatus 100, 100-1 to be transmitted to the display apparatus 100, 100-1.

Figure 5:
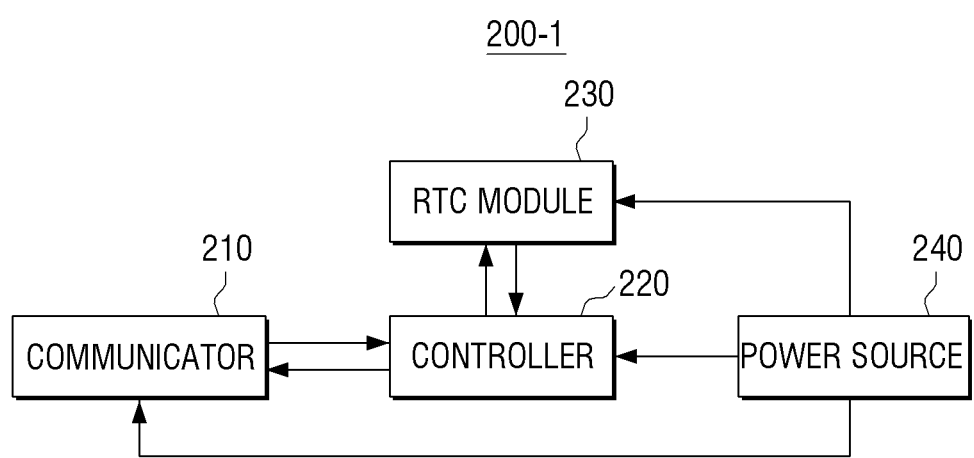
FIG. 5 is a block diagram which illustrates the details of an example of a remote controller.

FIG. 5 is a block diagram which illustrates a detailed example of a remote controller.

Referring to FIG. 5, a remote controller 200-1 further includes an RTC module and a power source in addition to a communicator 210 and a controller 220.

Time information is managed by the RTC module, since the remote controller 200-1 provides time information to the display apparatus 100, 100-1 when the display apparatus 100, 100-1 is powered off and is then powered on again. At the request of the display apparatus 100, 100-1, the current time information managed by the RTC module is transmitted to the display apparatus 100, 100-1.

Further, as in the aforementioned exemplary embodiment, when the display apparatus 100, 100-1 is turned off or powered off, time information managed by the display apparatus 100, 100-1 is transmitted to the remote controller 200-1, and the remote controller 200-1 resets the RTC module based on the received time information. The remote controller 200-1 includes a battery to maintain power source, which can be a rechargeable battery.

Hereinafter, a method for setting time of a display apparatus according to various exemplary embodiments will be described.

FIGS. 6 to 9 are flow charts illustrating a method for setting time of a display apparatus according to various exemplary embodiments.

Figure 6:
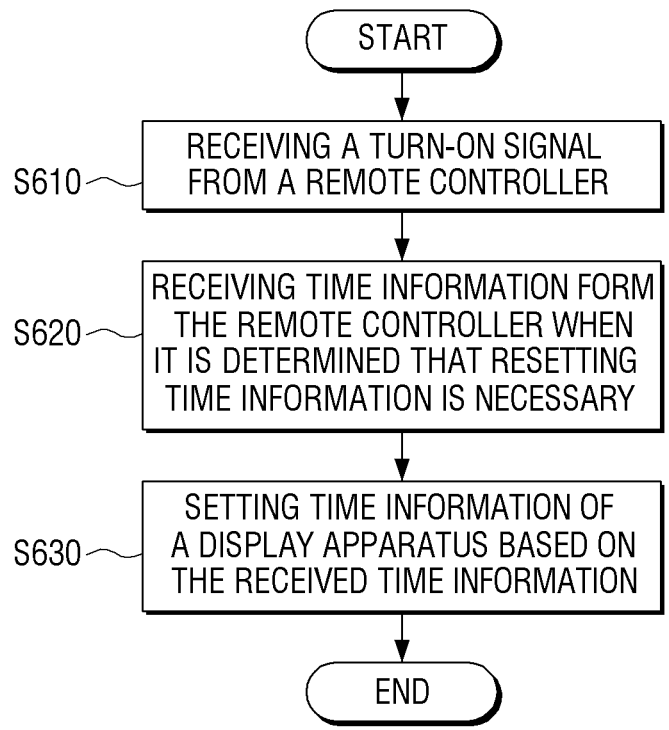
FIGS. 6 to 9 are flow charts which illustrate one or more methods for setting time of a display apparatus according to various exemplary embodiments.

Referring to FIG. 6, the method for setting time of a display apparatus according to various exemplary embodiments includes: receiving a Turn-on signal from the remote controller (S610); receiving time information from the remote controller in response to a determination that the time information is necessary (S620); and setting time information of the display apparatus based on the received time information (S630).

The receiving time information (S620) includes: requesting time information from the remote controller upon receiving the Turn-on signal when an external power source of the display apparatus is shut off and reconnected; and receiving time information from the remote controller in response to the request.

However, when the Turn-on signal is received from the remote controller, the external power source is connected to the display apparatus, or charge power remains in the display apparatus, the time information does not have to be received from the remote controller.

Further, the method for setting time information may further include transmitting the predetermined time information to the remote controller when the external power source is connected to the display apparatus and then shut off therefrom.

Also, the method for setting time information may further include receiving a Turn-off signal from the remote controller and transmitting the predetermined time information to the remote controller.

Meanwhile, the method for setting time information of the display apparatus by the remote controller according to one of the exemplary embodiments includes: transmitting the Turn-on signal, which is generated according to an input user command (S810), to the display apparatus (S820); when there is a request from the display apparatus (S830), and transmitting time information of the remote controller to the display apparatus (S840).

At this point, transmitting the time information includes receiving request of time information from the display apparatus, and transmitting time information of the remote controller to the display apparatus, in response to the request.

The method for setting time information may further include: receiving time information of the display apparatus from the display apparatus when powered off; and resetting time information from the remote controller based on the received time information.

Further, the method for setting time information may include requesting time information from the display apparatus upon receiving a user command to turn off the display apparatus; receiving the time information from the display apparatus in response to the request; resetting time information of the remote controller based on the received time information; and transmitting a signal to turn off the display apparatus to the display apparatus.

Figure 7:
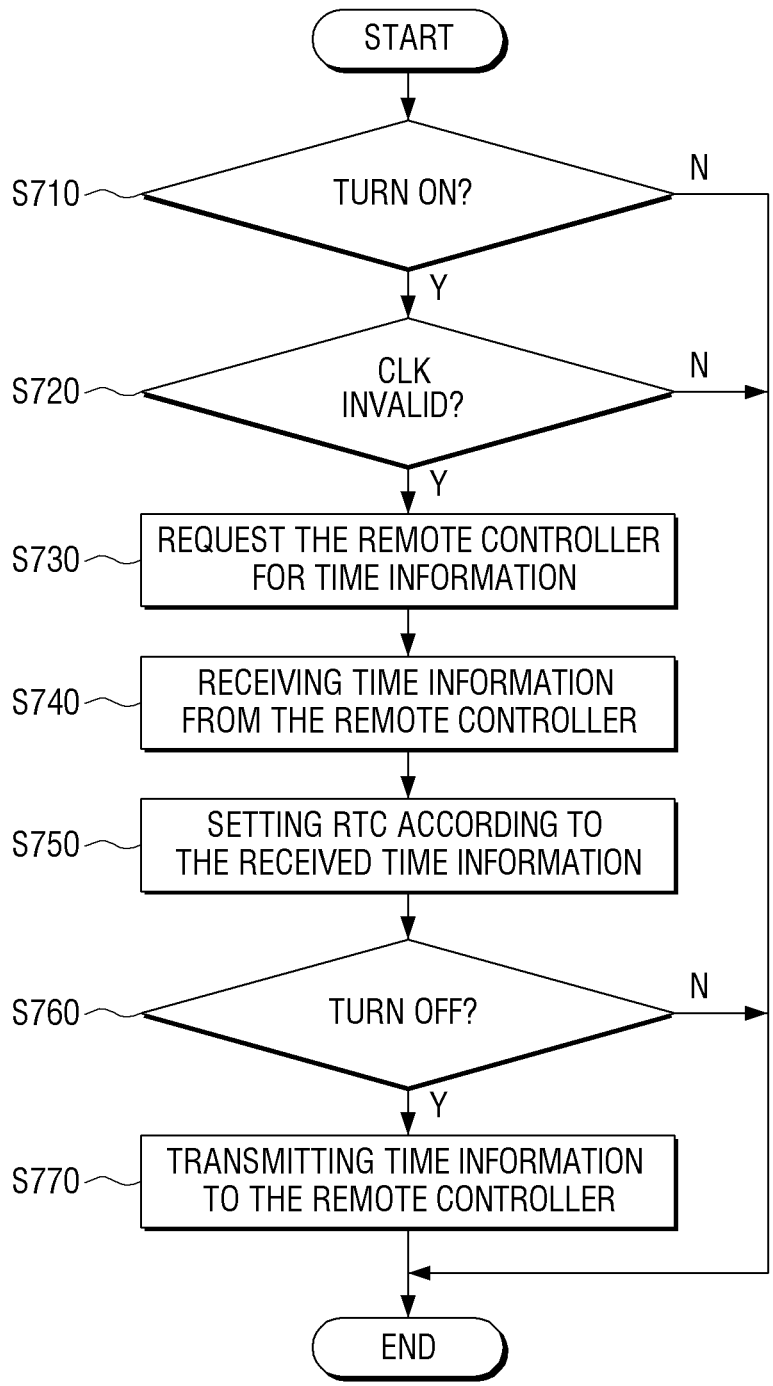
Figure 8:
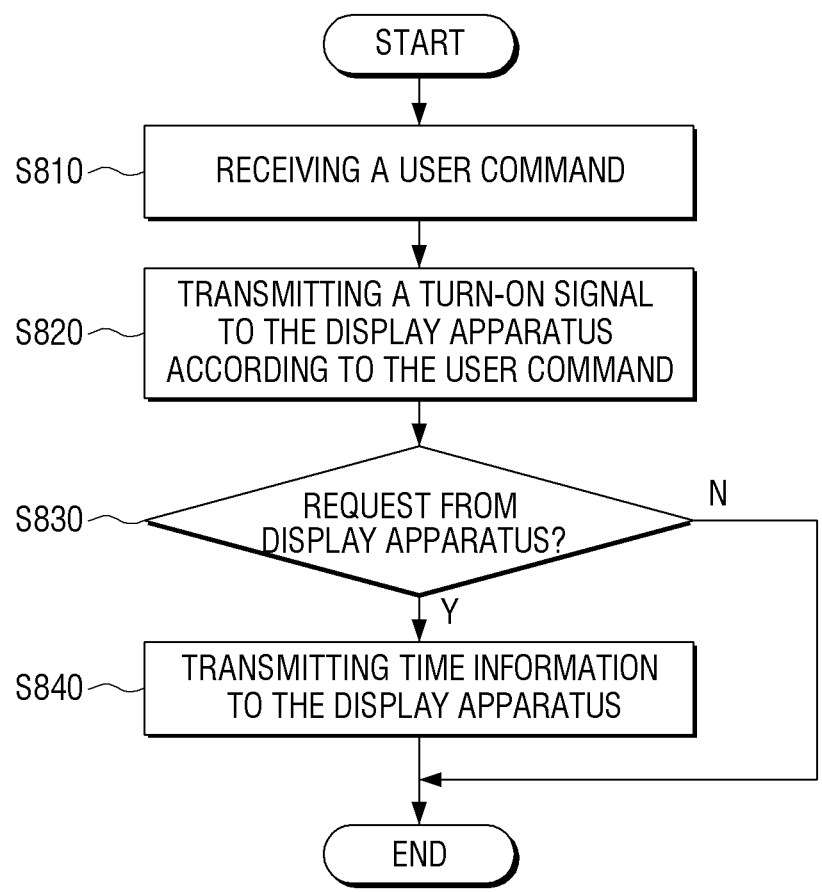
Figure 9:
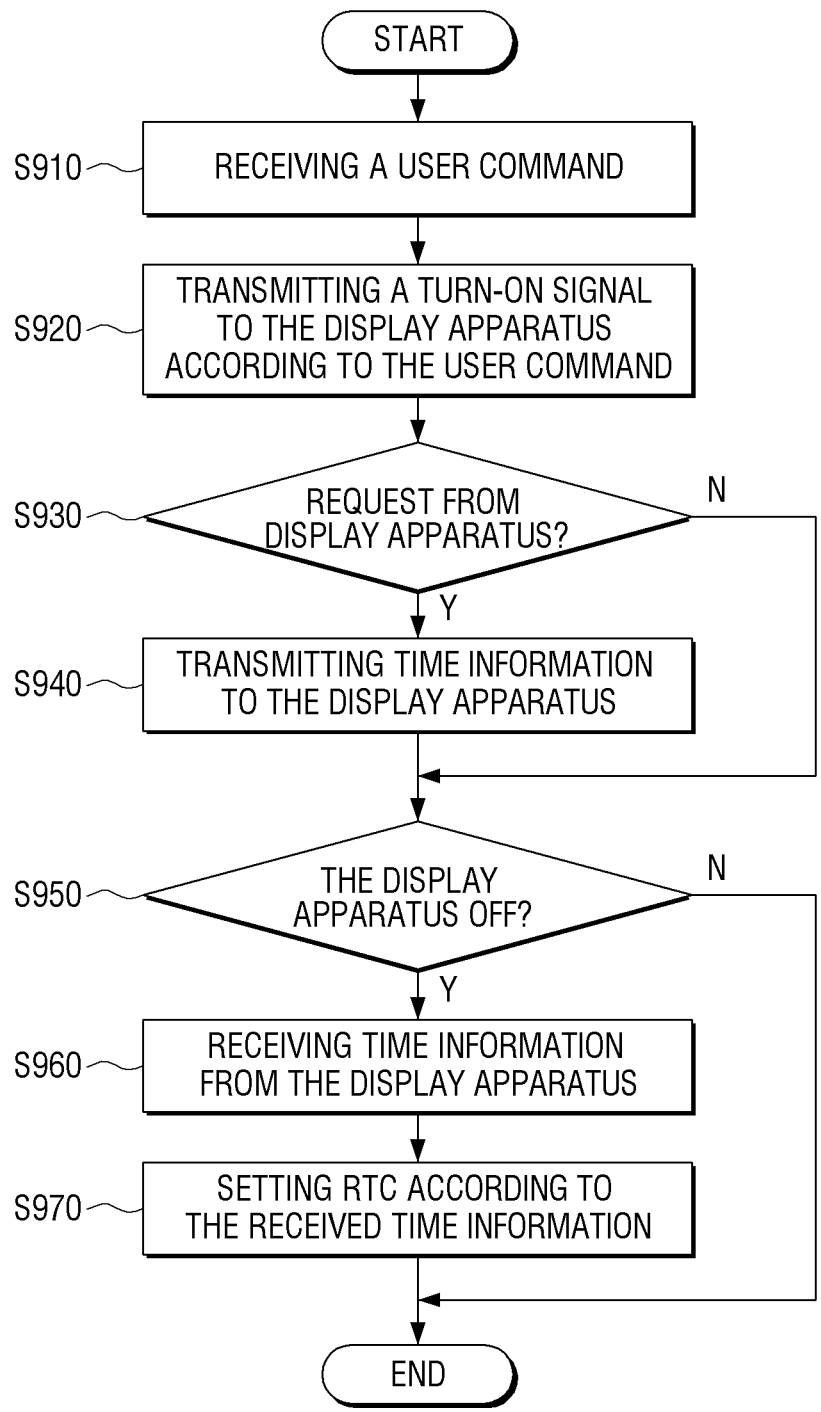

FIGS. 7 to 9 are flow charts which illustrate a whole flow of the method for setting time of a display apparatus.

As shown in FIG. 7, when the display apparatus is turned on (S710), the display apparatus checks validity of a clock (S720). If the clock is found to be not valid, that is, time information is lost and initialized, a for time information from the remote controller is made (S730). Time information is received from the remote controller (S740), and the RTC is set based on the received time information (S750). When the display apparatus is turned off (S760-Y), time information of the display apparatus is transmitted to the remote controller.

As shown in FIG. 9, when a user command is received (S910), the remote controller transmits a Turn-on signal to the display apparatus according to the user command (S920), and at the request of the display apparatus (S930-Y), transmits time information to the display apparatus (S940). When the display apparatus is turned off (S950-Y), the remote controller receives time information from the display apparatus (S960), and sets the RTC based on the received time information (S970).

The method of setting time information of the display apparatus as described above may be stored in a non-transitory computer-readable recording medium in which a program to perform the aforementioned method is recorded.

Herein the non-transitory readable medium refers to a medium that stores data semi-permanently, not for a short time such as register or cache, and has an ability to read through a transmitting apparatus. Examples of the non-transitory readable medium include CD, DVD, hard disc, Blue-ray Disc™, USB, memory card, ROM, etc.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for setting time information of a display apparatus, the method comprising:
transmitting time information to a remote controller when external power is shut off;
determining whether the display apparatus has lost the time information;
automatically receiving the time information from the remote controller in response to the display apparatus being turned on and determining that the display apparatus has lost the time information; and
setting the time information of the display apparatus based on the received time information.

2. The method as claimed in claim 1, wherein receiving the time information comprises:
automatically requesting the time information from the remote controller when the display apparatus is turned on and the display apparatus is connected; and
receiving the time information from the remote controller in response to the automatic request.

3. The method as claimed in claim 1, wherein when the external power is connected to the display apparatus, or when charge power remains in the display apparatus, the time information is not received from the remote controller.

4. The method as claimed in claim 1, further comprising:
receiving a Turn-off signal from the remote controller; and
transmitting to the remote controller current time information of the display apparatus.

5. A method for setting time of a display apparatus by a remote controller, the method comprising:
transmitting to the display apparatus a Turn-on signal which is generated according to a user command; and
automatically transmitting time information of the remote controller to the display apparatus in response to the generation of the Turn-on signal by the user command and a determination that the display apparatus has lost the time information.

6. The method as claimed in claim 5, wherein the transmitting time information further comprises:
receiving from the display apparatus an automatic request of the time information in response to the generation of the Turn-on signal by the user command; and
in response to the automatic request of the time information, transmitting the time information of the remote controller to the display apparatus.

7. The method as claimed in claim 5, further comprising:
receiving from the display apparatus the time information related to the display apparatus when the display apparatus is off; and
resetting the time information of the remote controller based on the received time information.

8. The method as claimed in claim 5, comprising:
requesting the display apparatus for the time information upon receiving a user command to turn off the display apparatus;
receiving the time information from the display apparatus in response to the request;
resetting the time information of the remote controller based on the received time information; and
transmitting to the display apparatus a signal to turn off the display apparatus.

9. A display apparatus, comprising:
a communicator configured to transmit time information to a remote controller when external power is shut off; and
a controller configured to determine whether the display apparatus has the lost time information, control the communicator to automatically receive the time information in response to the display apparatus being turned on and determining that the display apparatus has lost the time information, and set the time information of the display apparatus based on the received time information.

10. The display apparatus as claimed in claim 9, wherein the controller is configured to control to automatically request the time information from the remote controller when the display apparatus is turned on and the display apparatus is reconnected, and to receive the time information from the remote controller in response to the automatic request.

11. The display apparatus as claimed in claim 9, wherein the controller further controls not to receive the time information from the remote controller when the external power is connected to the display apparatus or when charge power remains in the display apparatus.

12. The display apparatus as claimed in claim 9, wherein the controller is configured to control the current time information of the display apparatus to be transmitted to the remote controller when the communicator receives a Turn-off signal from the remote controller.

13. A remote controller, comprising:
a communicator configured to transmit to the display apparatus a Turn-on signal which is generated according to a input user command; and
a controller configured to control time information of the remote controller to be automatically transmitted to the display apparatus in response to the generation of the Turn-on signal by the input user command and a determination that the display apparatus has lost the time information.

14. The remote controller as claimed in claim 13, wherein the communicator receives from the display apparatus the time information of the display apparatus when the display apparatus is off, and the controller resets the time information of the remote controller based on the received time information.

15. The remote controller as claimed in claim 13, wherein upon receiving a user command to turn off the display apparatus, the communicator is configured to request the time information from the display apparatus, and receives the time information from the display apparatus in response to the request, and
the controller resets the time information of the remote controller based on the received time information, and controls a signal to turn off the display apparatus to be transmitted to the display apparatus.

16. The method as claimed in claim 1, wherein the time information is instantly received from the remote controller without user input on the remote controller, and the setting the time information comprising synchronizing a default time value of the display apparatus with the time information received from the remote controller.

17. The method as claimed in claim 1, wherein the remote controller comprises a real time clock (RTC) module for managing the time information.

\* \* \* \* \*